US008967398B2

(12) United States Patent
McLemore et al.

(10) Patent No.: US 8,967,398 B2
(45) Date of Patent: Mar. 3, 2015

(54) LOCKER STRAP SYSTEM

(71) Applicants: Chelsea F. McLemore, Astoria, NY (US); James G. Lee, Westlake, OH (US)

(72) Inventors: Chelsea F. McLemore, Astoria, NY (US); James G. Lee, Westlake, OH (US)

(73) Assignee: Acco Brands Corporation, Lake Zurich, IL (US)

( * ) Notice: Subject to any disclaimer, the term of this patent is extended or adjusted under 35 U.S.C. 154(b) by 0 days.

(21) Appl. No.: 13/714,534

(22) Filed: Dec. 14, 2012

(65) Prior Publication Data

US 2014/0165472 A1 Jun. 19, 2014

(51) Int. Cl.
| | |
|---|---|
| *A47H 1/10* | (2006.01) |
| *A47F 5/08* | (2006.01) |
| *F16M 13/02* | (2006.01) |
| *E06B 3/34* | (2006.01) |
| *A47K 10/04* | (2006.01) |
| *A47B 97/00* | (2006.01) |
| *A47G 29/00* | (2006.01) |
| *A47B 43/00* | (2006.01) |
| *A47B 61/00* | (2006.01) |

(52) U.S. Cl.
CPC .............. *F16M 13/02* (2013.01); *A47F 5/0892* (2013.01); *E06B 3/34* (2013.01); *A47K 10/04* (2013.01); *A47B 97/00* (2013.01); *A47G 29/00* (2013.01); *A47B 43/006* (2013.01); *A47B 61/00* (2013.01)
USPC ..................... 211/119.004; 211/113; 248/327

(58) Field of Classification Search
CPC ....... A47K 10/04; A47K 10/10; A47K 3/281; A47B 43/006; A47B 43/003; A47B 47/00; A47B 61/00; A47B 61/02; A47B 97/00; A47G 29/00; A47G 25/743; A47G 25/00; A47G 25/08; A47G 25/74; A47G 25/746; F16M 13/02; E06B 3/34; E06B 7/28; E06B 7/08; A47F 7/0035; A47F 5/0892; A47F 2005/0012; A47F 5/08; A47F 5/0876; A47F 5/10; D06F 57/12; A44B 11/20; A44B 11/223
USPC .......................... 40/606.07, 655, 607.14, 658; 211/119.004, 94.02, 113, 118, 13.1, 211/119.009, 86.01, 87.01; 24/180, 188; 49/381; 29/428; 248/205.1, 205.2, 207, 248/214, 215, 309.1, 317, 323, 327, 328
See application file for complete search history.

(56) References Cited

U.S. PATENT DOCUMENTS

| | | | | | |
|---|---|---|---|---|---|
| 1,840,138 | A | * | 1/1932 | Swallow | 248/222.12 |
| 1,980,730 | A | * | 11/1934 | Matchette | 312/200 |
| 2,270,796 | A | * | 1/1942 | Hauser | 211/119.004 |
| 2,565,978 | A | * | 8/1951 | Meriwether | 248/327 |
| 2,634,480 | A | * | 4/1953 | Ray | 24/180 |
| 2,925,916 | A | * | 2/1960 | Pollock | 211/119.004 |
| 3,355,030 | A | * | 11/1967 | Cathcart | 211/88.04 |
| 4,052,805 | A | * | 10/1977 | Potter | 40/124 |
| 4,846,430 | A | * | 7/1989 | Ke | 248/215 |
| D337,467 | S | | 7/1993 | Schmidt | |
| 5,238,305 | A | * | 8/1993 | Feller | 383/22 |
| 5,407,111 | A | * | 4/1995 | Lanouette et al. | 224/579 |
| 5,474,192 | A | * | 12/1995 | Hartzell | 211/90.04 |
| 5,927,840 | A | * | 7/1999 | Bzowski | 312/321.5 |
| 5,957,308 | A | * | 9/1999 | Zierenberg | 211/64 |
| 6,029,830 | A | * | 2/2000 | Manookian | 211/87.01 |

(Continued)

*Primary Examiner* — Jennifer E Novosad
(74) *Attorney, Agent, or Firm* — Thompson Hine L.L.P.

(57) ABSTRACT

A system for use with a locker door having an upper opening and a lower opening, the system including a strap passed through the upper opening and the lower opening of the locker door. The system further includes a component configured to be releasably coupled to the strap.

19 Claims, 7 Drawing Sheets

(56) References Cited

U.S. PATENT DOCUMENTS

| | | | | |
|---|---|---|---|---|
| 6,128,844 | A * | 10/2000 | Stermer et al. | 40/658 |
| 6,814,418 | B2 * | 11/2004 | D'Orso | 312/351 |
| 7,021,825 | B1 * | 4/2006 | Schultz | 383/76 |
| 7,198,835 | B2 * | 4/2007 | Anderson | 428/100 |
| 7,481,340 | B2 * | 1/2009 | Murphy | 223/85 |
| 8,113,602 | B2 * | 2/2012 | Heimler et al. | 312/217 |
| 2003/0049124 | A1 * | 3/2003 | Liu | 416/5 |
| 2006/0049124 | A1 * | 3/2006 | Wang | 211/113 |
| 2006/0207956 | A1 * | 9/2006 | Sivers | 211/113 |
| 2007/0102380 | A1 * | 5/2007 | Shaw | 211/70.5 |
| 2009/0184077 | A1 * | 7/2009 | Curet et al. | 211/117 |
| 2010/0270246 | A1 * | 10/2010 | Rodriguez | 211/34 |
| 2011/0025181 | A1 * | 2/2011 | Vinke et al. | 312/257.1 |
| 2012/0037772 | A1 * | 2/2012 | Inglehart | 248/224.8 |

* cited by examiner

LOCKER STRAP SYSTEM

The present invention is directed to a locker strap system, more particularly, to a locker strap system for mounting components to a locker door or the like.

BACKGROUND

Students and others utilize lockers and other storage devices to store books, coats, backpacks, papers and other loose items. However, most lockers provide relatively little storage space and do not provide flexible or modular storage and display features. In addition, and more specifically, the locker space that is provided is often not suitable or conducive for organizational storage of smaller items, while the space on the door itself is often under-utilized.

SUMMARY

In one embodiment the invention is a strap system including a strap which is passable through openings or louvers in a locker door. More particularly in one embodiment the invention is a system for use with a locker door having an upper opening and a lower opening, the system including a strap passed through the upper opening and the lower opening of the locker door. The system further includes a component configured to be releasably coupled to the strap. In one embodiment the system further includes a variety of storage, display, and/or organizational components that can be coupled to the straps.

DETAILED DESCRIPTION

Figure 1:
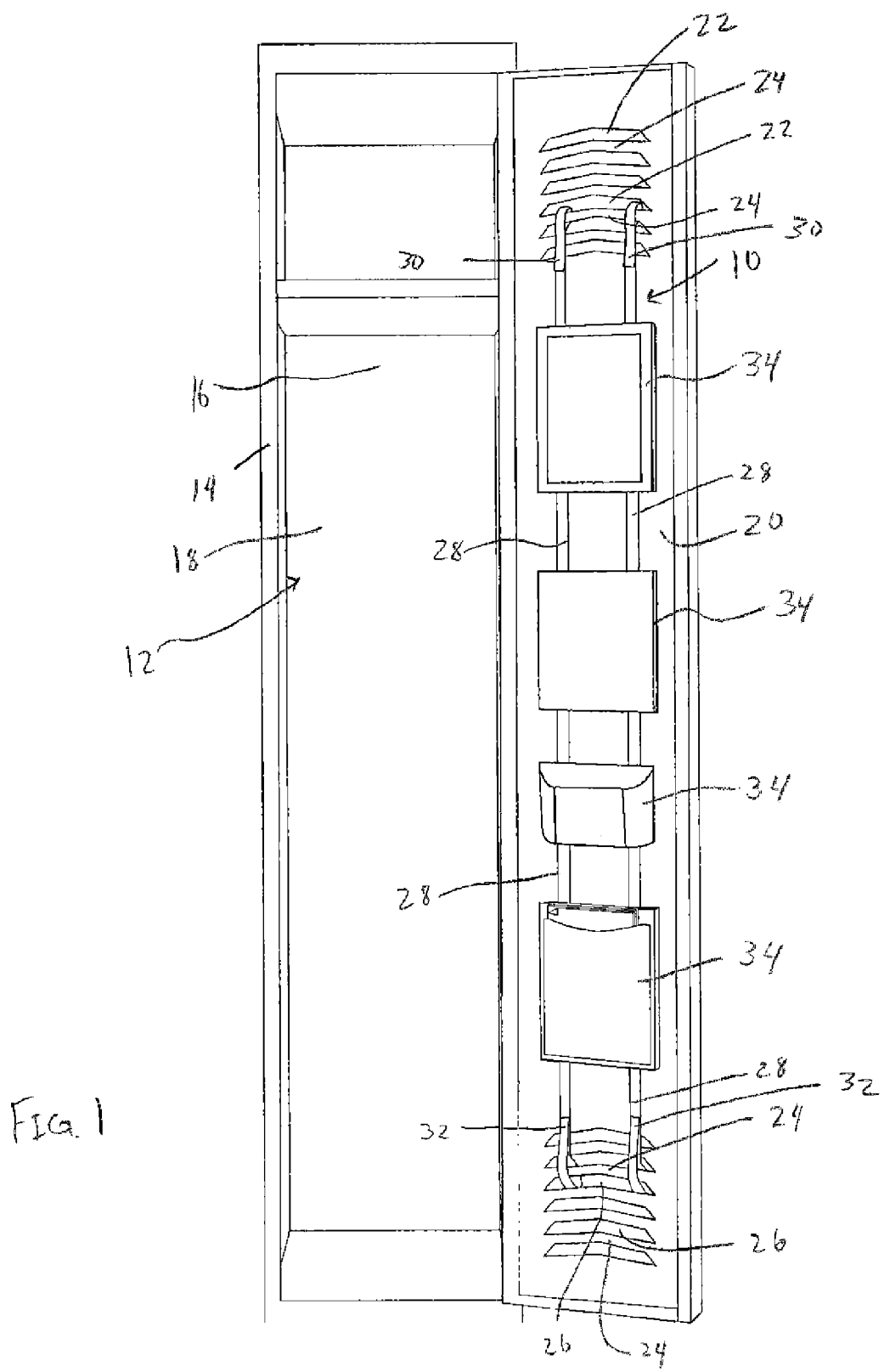
FIG. 1 is a front perspective view of one embodiment of the strap system of the present invention, mounted to the inside of a locker door.

In one embodiment the strap system of the present invention, generally designated 10, is useable in conjunction with a locker 12 or the like. The locker 12 may include a locker body 14 defining an inner volume 16 having a front opening 18. The locker 12 includes a locker door 20 that is hingedly connected to the locker body 14 to selectively cover/close the front opening 18 when the locker door 20 is in its closed position. The locker door 20 may include a set of upper louvers, vents or openings 22 (together termed "openings" herein) adjacent to an upper end thereof, or in an upper portion or upper half of the locker door 20, with dividers 24 therebetween. Similarly, the locker door 20 may include a set of lower openings 26 adjacent to a lower end thereof, or in a lower portion or lower half of the door 20, with dividers 24 therebetween. The openings 22, 26 are internally positioned in the door 20 such that the openings 22, 26 are entirely spaced apart from the outer perimeter of the door 20.

Figure 2:
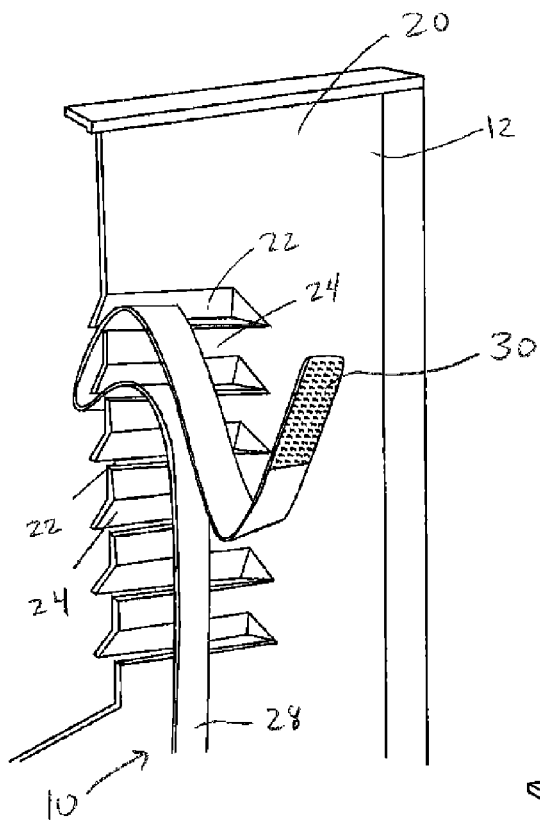
FIG. 2 is a detailed perspective view of an upper end portion of one of the straps of FIG. 1, shown in a disengaged position.

The strap system 10 can be secured to the locker door 20 and be at least partially positioned on an inner surface thereof, as shown in FIG. 1. In particular, the strap system 10 may include a pair of generally vertically oriented, parallel straps 28 coupled to the locker door 20. Each strap 28 can be secured to the locker door 20 by passing portions of the straps 28 through the upper 22 and/or lower 26 openings. In particular, as shown in FIG. 2, in one embodiment the strap includes an upper end portion 30 that is passed outwardly through one opening 22, around a louver divider 24, and passed inwardly through another upper opening 22 of the locker door 20.

Figure 3:
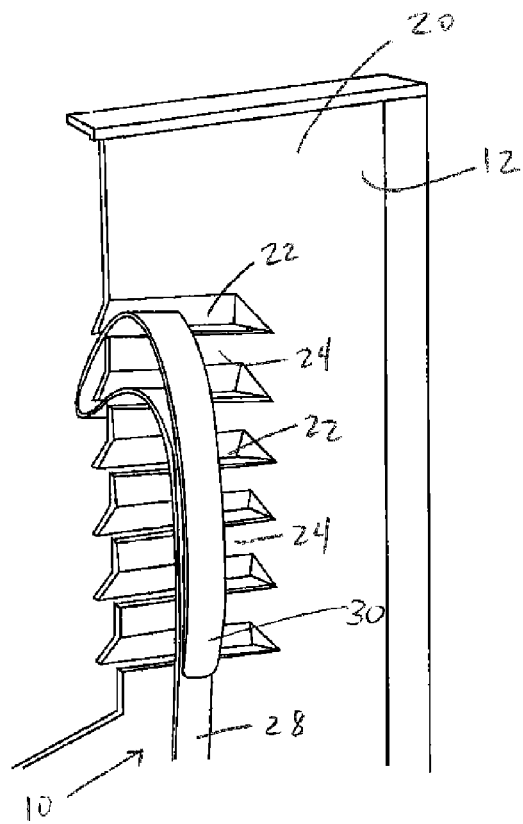
FIG. 3 is a detailed perspective view of an upper end portion of one of the straps of FIG. 1, shown in an engaged position.
Figure 4:
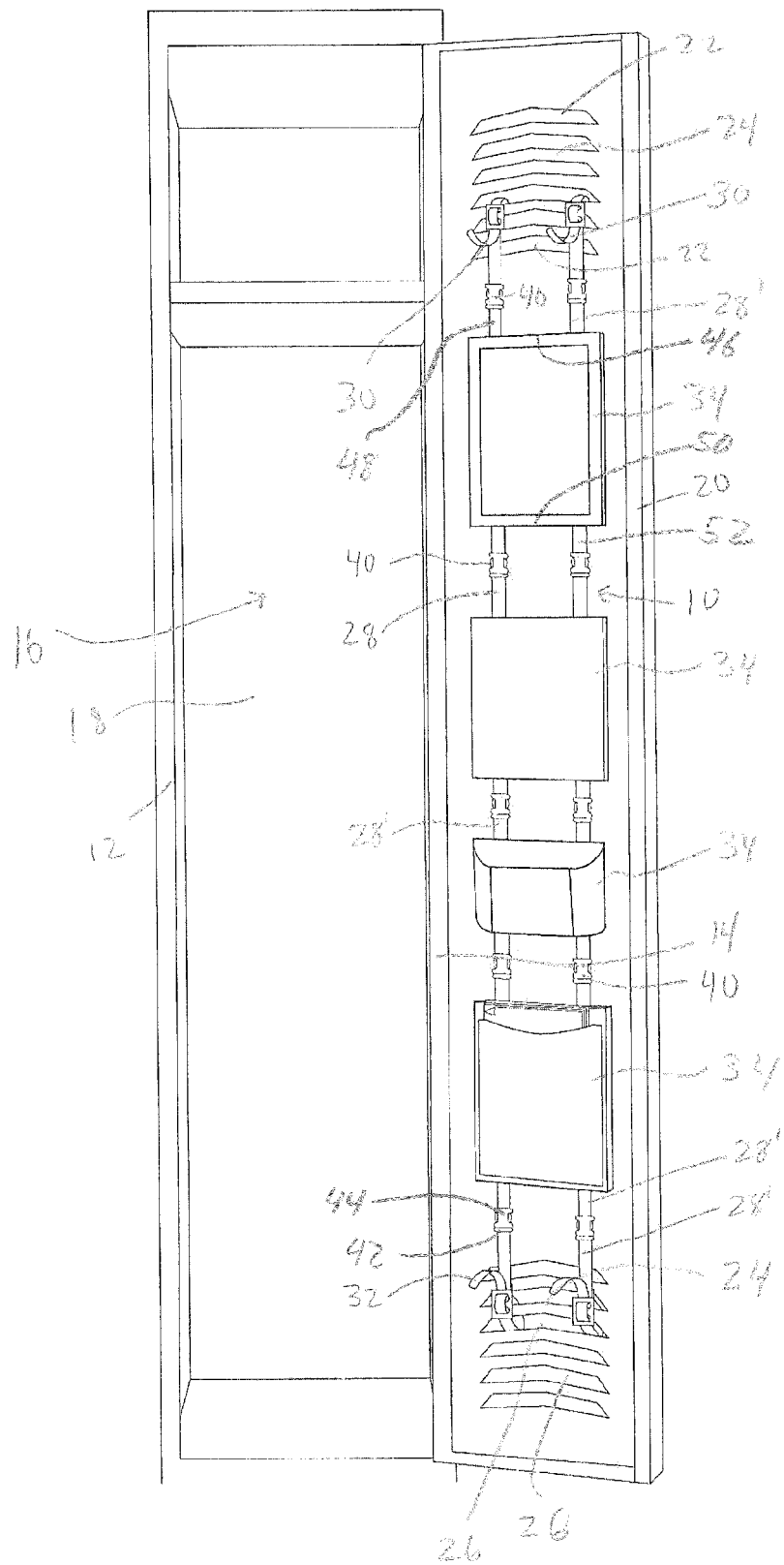
FIG. 4 is a front perspective view of another embodiment of the strap system of the present invention, mounted to the inside of a locker door.
Figure 5:
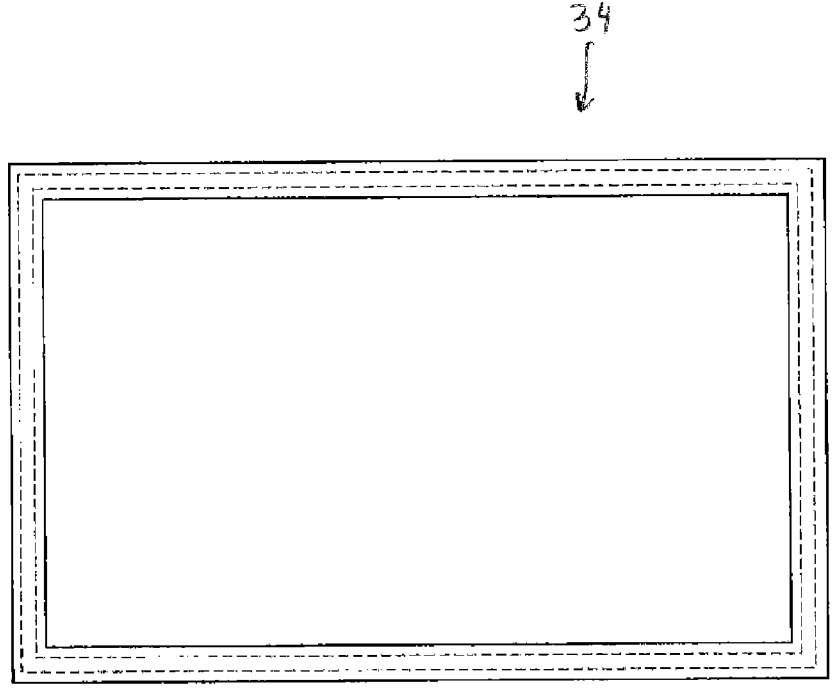
FIG. 5 is a front view of a component of the system of FIG. 1.
Figure 7:
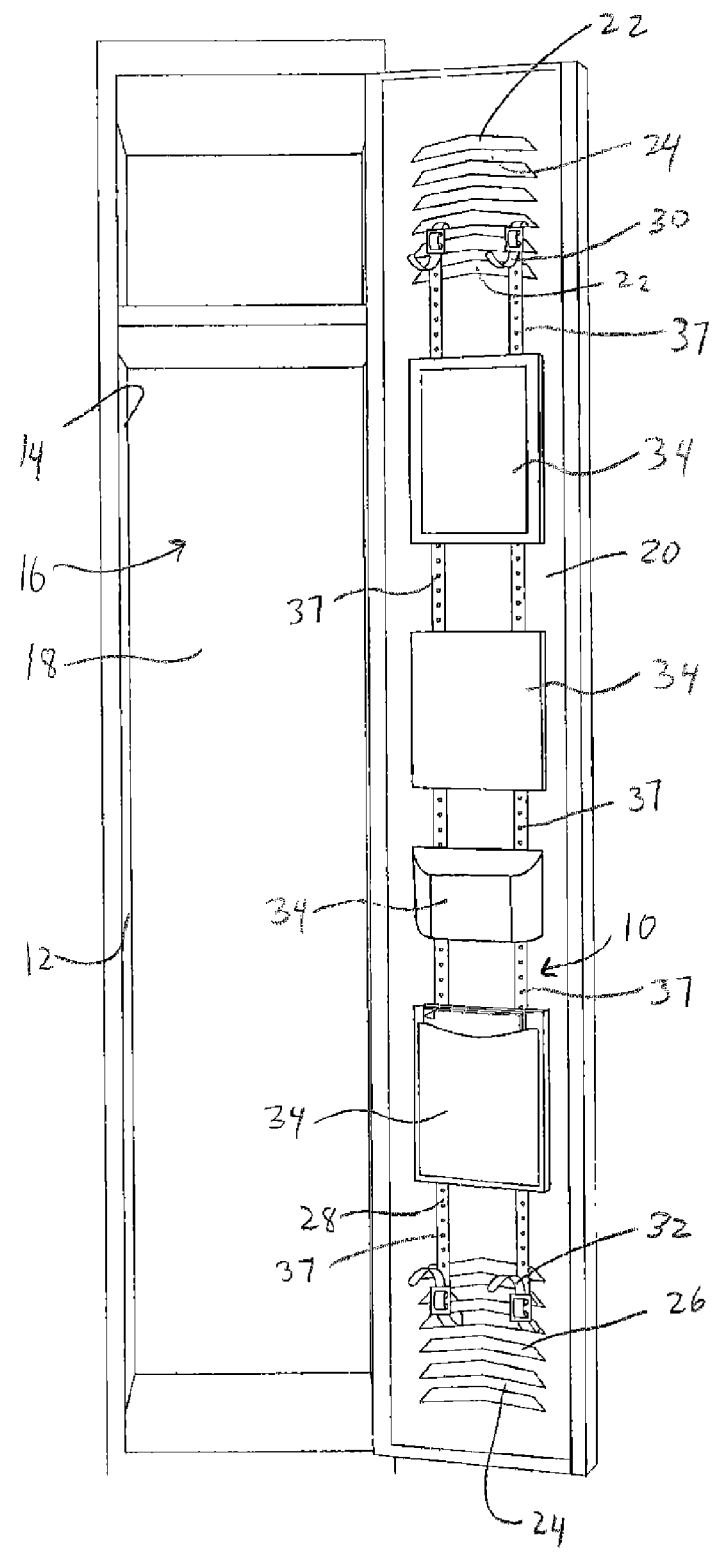
FIG. 7 is a front perspective view of another embodiment of the strap system of the present invention, mounted to the inside of a locker door.

The upper end portion 30 of the strap 28 can include, or be made of, a portion of hook-and-loop fastening material, such as VELCRO® material. The body portion of the strap 28 can be made of or include a corresponding portion of hook-and-loop fastening material. In one case, for example, the entire inwardly-facing surface, or the majority or substantially all of the inwardly-facing surface, of the straps 28 is made of or covered with a portion of hook-and-loop fastening materials. The end portion 30 of the strap 28 can thereby be secured to the body of the strap 28 by pressing the portions of hook-and-loop fastening materials together, as can be seen in comparing FIGS. 2 and 3. The lower end portion 32 of each strap 28 can be secured to itself/the locker door 20 in a similar manner. However, it should be understood that the straps 28 can be secured to the locker door 20/themselves by a wide variety of mechanisms or means, including buckles (as shown in FIGS. 4 and 7), snaps, clasps, adhesives, magnets, buttons, straps, hooks, ties, interengaging geometries, etc. Moreover, if desired each strap 28 can form a large loop such that the upper end portion of each strap 28 is passed through an upper opening 22, extends vertically downwardly on the outside of the locker door 20 and passes through the lower opening 26 and is joined to itself to form a complete loop.

The straps 28 can be secured in these manners and therefore be mounted and/or adjusted to take up any additional length in the straps 28 and enable the strap system 10 to be properly mounted to locker doors 20 of varying shapes and sizes. The straps 28 may also have some elasticity to allow the straps 28 to adjust to locker doors 20 of differing dimensions. In one case, for example, each strap 28 is elastically deformable at least about 5%, or at least about 10%, along its length. However, the straps 28 need not necessarily be elastic.

The locker strap system 10 can include, or may be used in conjunction with, a variety of components 34 configured to be releasably coupled to the straps 28. In particular, FIG. 1 illustrates four components 34 in the form of a mirror, a whiteboard, a small pocket and a large pocket. The components 34 can take any of a wide variety of other forms beyond those shown in FIG. 1, including but not limited to notebooks, planners, storage containers, calendars, cork boards, picture frames, writing instruments, pencil cups, school products and supplies, business/office products and supplies, etc.

Figure 6:
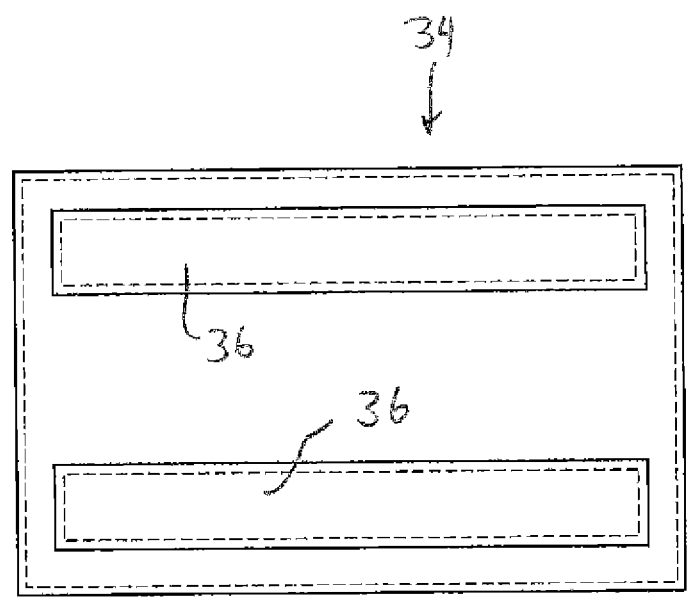
FIG. 6 is a back view of the component of FIG. 5.

The system 10 and/or components 34 may include a coupling means or mechanisms configured to releasably couple the component 34 to the straps 28. As noted above, in one illustrated embodiment, the straps 28 include portions of hook-and-loop fastener material (i.e. VELCRO®) secured thereto or forming a part thereof and covering the inwardly-facing surface thereof. Each component 34 can include corresponding portions of hook-and-loop fastening material 36 secured thereto. For example, as shown in FIG. 6, each component 34 may include two generally horizontally-extending strips of hook-and-loop fastening material 36 positioned on a rear surface thereof. In this manner, each component 34 can be releasably coupled to the associated strap(s) 28 by simply facing the back side of the components against the strap(s) 28 and pressing the components 34 against the strap(s) 28. The securing structure/method is relatively strong such that the components 34 remain in place, even when the locker door 20 is slammed shut, which can apply relatively high forces. In this manner, the components 34 can be configured to be releasably coupled to the strap(s) 28 at any of a variety of positions along the height of the strap(s) 28.

Figure 8:
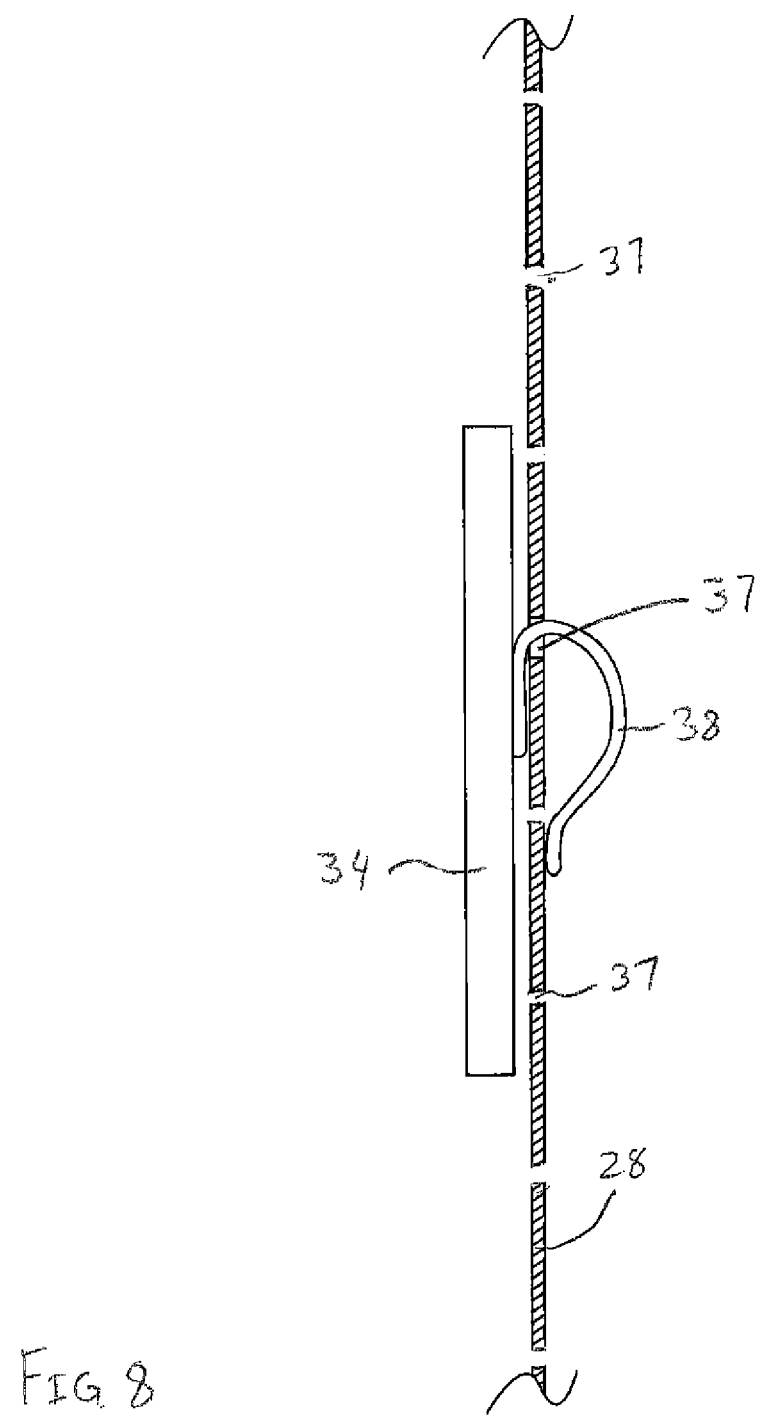
FIG. 8 is a side view of a component of the system of FIG. 7.

However, any of a wide variety of coupling devices, systems or means can be used for releasably securing the components 34 to the straps 28. For example, in one embodiment as shown in FIG. 7, each of the straps 28 may include a plurality of generally vertically spaced/longitudinally spaced holes or openings 37 therein. As shown in FIG. 8, each component 34 may include hooks or protrusions 38 mounted thereto on a back side thereof, wherein the horizontal spacing of the hooks 38 on a component 34 corresponds to the horizontal spacing of the straps 28. In this manner, each hook 38 can be passed through one of the openings 37 of the straps 28 to releasably secure the component 34 to the straps 28. Moreover, the components 34 can be releasably coupled to the straps 28 by any of a wide variety of other devices, means or mechanisms, including but not limited to those described above by which the straps 28 can be secured to themselves and/or the locker door.

As shown in FIG. 4, in one embodiment each strap 28 includes a plurality of strap segments 28' which are releasably coupled together. In one embodiment the strap segments 28' are releasably secured by clips 40, which, in the depicted embodiment, each have a first portion 42 and second portion 44, although the strap segments 28' can be secured by any of a wide variety of other devices, means or mechanisms. In this case, each component 34 may be sold and/or packaged with strap segments 28' of an appropriate length such that a user can "daisy chain," or join in series, the strap segments 28' together to form straps 28 of desired/appropriate length. In this case, each component 34 can be permanently coupled to the associated strap segment 28' but again can be releasably attached (i.e. by hook and loop fastening material, etc.), and in any case is releasably attached to other strap segments 28' by the clips 40. As shown in FIG. 4, in one embodiment, some of the strap segments 28' extend beyond an upper edge 46 of the respective component 34 to define upper strap segments 48, and other strap segments 28' extend beyond a lower, opposite edge 50 of the respective component 34 to define lower strap segments 52.

If desired, only a single strap 28 can be utilized and the components 34 can be releasably coupled to the single strap 28. The use of two straps 28 may provide greater stability and more secure coupling, while the use of a single strap 28 may provide cost savings and ease of set-up. Moreover, in one embodiment the openings 22, 26/straps 28 are configured such that the straps 28 extend at least about one-half the height of the locker door 20 to ensure that the strap system 10 provides sufficient storage/display functionality to a relatively high surface area of the locker door 20, providing greater benefits to the user.

Having described the invention in detail and by reference to the various embodiments, it should be understood that modifications and variations thereof are possible without departing from the scope of the claims of the present application.

What is claimed is:

1. A system for use with a locker door having an upper opening and a supplemental upper opening with an upper divider positioned therebetween, the upper opening and supplemental upper opening being positioned internal to and spaced apart from an outer perimeter of the locker door, the locker door further having a lower opening and a supplemental lower opening with a lower divider positioned therebetween, the lower opening and supplemental lower opening being positioned internal to and spaced apart from the outer perimeter of the locker door, the system comprising:
   a strap including a first portion, a second portion, and a body portion extending an entire length therebetween, wherein the body portion has a uniform width, and wherein the first portion of the strap is adapted to pass through the upper opening of the locker door, around the upper divider, and through the supplemental upper opening of the locker door, the first portion being further adapted to be secured to the body portion of the strap, and wherein the second portion of the strap is adapted to pass through the lower opening of the locker door, around the lower divider, and through the supplemental lower opening of the locker door, the second portion being further adapted to be secured to the body portion of the strap; and
   a component adapted to be releasably coupled to and decoupled from the body portion of the strap while the first portion of the strap is mounted to the upper opening of the locker door and the second portion of the strap is simultaneously mounted to the lower opening of the locker door.

2. The system of claim 1 further comprising a supplemental strap adapted to pass through the upper opening and the lower opening and adapted to be oriented generally parallel with the strap, wherein the component is adapted to be simultaneously releasably coupled to the strap and the supplemental strap.

3. The system of claim 1 wherein the strap includes a portion of hook-and-loop fastening material coupled thereto, and wherein the component includes a corresponding portion of hook-and-loop fastening material coupled thereto to enable the component to be releasably coupled to the strap via the hook-and-loop fastening material.

4. The system of claim 3 further comprising a supplemental strap adapted to pass through the upper opening and the lower opening and adapted to be oriented generally parallel with the strap, the supplemental strap including a portion of hook-and-loop fastening material coupled thereto, wherein the component is adapted to be simultaneously releasably coupled to the strap and the supplemental strap via the hook-and-loop fastening material.

5. The system of claim 1 wherein the body portion of the strap has an elongate, longitudinal length extending from the first portion to the second portion, a width, and a thickness, wherein the width of the strap is greater than the thickness, and wherein the body portion includes a plurality of longitudinally-spaced openings therethrough, each opening extending entirely through the thickness of the strap in a direction substantially perpendicular to the length and to the width thereof, and wherein the component includes a protrusion that is receivable in one of said longitudinally-spaced openings to releasably couple the component to the strap.

6. The system of claim 1 further comprising a plurality of supplemental components adapted to be releasably coupled to the strap.

7. The system of claim 1 wherein the component is a school or office product.

8. The system of claim 1 wherein the component is adapted to be releasably coupled to the strap at any of a variety of positions along the length of the strap.

9. The system of claim 1 wherein the strap is oriented generally vertically.

10. The system of claim 1 wherein the upper opening is positioned at or adjacent to an upper end of the locker door and the lower opening is positioned at or adjacent to a lower end of the locker door, and wherein the strap extends at least about one-half of a height of the locker door.

11. The system of claim 1 further including the locker door, and wherein the locker door is hingedly connected to a locker body defining an inner volume and a front opening that is selectively covered by the locker door.

12. The system of claim 11, wherein said upper opening and said lower opening are each ventilation louvers in said locker door and are entirely spaced away from an outer perimeter of the locker door.

13. The system of claim 1 wherein the strap includes a plurality of strap segments releasably connected together.

14. A system for use with a locker door having an upper opening and a supplemental upper opening with an upper divider positioned therebetween, the upper opening and supplemental upper opening being positioned internal to and spaced apart from an outer perimeter of the locker door, the locker door further having a lower opening and a supplemental lower opening with a lower divider positioned therebetween, the lower opening and supplemental lower opening being positioned internal to and spaced apart from the outer perimeter of the locker door, the system comprising:
    a strap having an elongate, longitudinal length, a width, and a thickness, wherein the width is greater than the thickness, the strap including a plurality of longitudinally-spaced openings therethrough along the longitudinal length thereof, each opening extending entirely through the thickness of the strap in a direction substantially perpendicular to the length and to the width thereof, wherein a first portion of the strap is adapted to pass through the upper opening, around the upper divider, and through the supplemental upper opening of the locker door, the first portion of the strap being further adapted to be secured to a main body of the strap, and wherein a second portion of the strap is adapted to simultaneously pass through the lower opening, around the lower divider, and through the supplemental lower opening of the locker door, the second portion of the strap being further adapted to be secured to the body of the strap, to mount the strap to the locker door; and
    a component adapted to be releasably coupled to the strap, wherein the component includes a protrusion that is receivable in one of said longitudinally-spaced openings, wherein the protrusion is adapted to releasably couple the component to the strap while the strap is mounted to the locker door at both the upper and lower openings thereof, and wherein the component is adapted to be decouplable from the strap while the strap is mounted to the locker door at both the upper and lower openings thereof.

15. A method for securing at least one component to a locker door comprising:
    accessing a locker door, the locker door including:
        a first upper opening, a second upper opening, and an upper divider positioned between the first and second upper openings, wherein the upper openings are positioned internal to and spaced apart from an outer perimeter of the locker door, and
        a first lower opening, a second lower opening, and a lower divider positioned between the first and second lower openings, wherein the lower openings are positioned internal to and spaced apart from the outer perimeter of the locker door;
    accessing a strap having an elongate, longitudinal length, a width, and a thickness, wherein the width is greater than the thickness, the strap including a plurality of longitudinally-spaced openings therethrough along the longitudinal length thereof, each opening extending entirely through the thickness of the strap in a direction substantially perpendicular to the length and to the width of the strap,
    passing a first portion of the strap through the first upper opening, around the upper divider, and through the second upper opening, and securing the first portion of the strap to a main body of the strap;
    passing a second portion of the strap through the first lower opening, around the lower divider, and through the second upper opening, and securing the second portion of the strap to the body of the strap;
    providing at least one component, the component including a protrusion adapted to be received within at least one of the longitudinally-spaced openings of the strap;
    without removing the strap from the upper openings or the lower openings of the locker door, releasably securing the component to the strap by inserting the protrusion of the component into one of the longitudinally spaced openings of the strap.

16. The method of claim 15, further comprising:
    accessing a supplemental strap having an elongate, longitudinal length, a width, and a thickness, wherein the width is greater than the thickness, the supplemental strap including a plurality of longitudinally-spaced openings therethrough along the longitudinal length thereof, each opening extending entirely through the thickness of the supplemental strap in a direction substantially perpendicular to the length and to the width of the supplemental strap,
    passing a first portion of the supplemental strap through the first upper opening, around the upper divider, and through the supplemental second upper opening, and securing the first portion of the supplemental strap to itself, wherein the first portion of the supplemental strap is spaced away from the first portion of the strap by a lateral distance;
    passing a second portion of the supplemental strap through the first lower opening, around the lower divider, and through the second upper opening, and securing the second portion of the supplemental strap to itself, wherein the second portion of the supplemental strap is spaced away from the second portion of the strap by the lateral distance;
    without removing the strap from the upper openings or the lower openings of the locker door, releasably securing the component to both the strap and the supplemental strap, wherein the component further includes a supplemental protrusion spaced away from the protrusion by the lateral distance, by inserting the protrusion into one of the longitudinally-spaced openings of the strap and inserting the supplemental protrusion into one of the longitudinally-spaced openings of the supplemental strap.

17. A system for use with a locker door, the system comprising:
    a first upper strap and a second upper strap, each upper strap including a locker attachment portion and a component coupling portion, wherein the locker attachment portion of each upper strap is adapted to pass through an upper opening of the locker door and secure the respective upper strap to the locker door, spacing the first and second upper straps apart from each other by a lateral distance;

a first lower strap and a second lower strap, each lower strap including a locker attachment portion and a component coupling portion, wherein the locker attachment portion of each lower strap is adapted to pass through a lower opening of the locker door and secure the respective lower strap to the locker door, spacing the first and second lower straps apart from each other by the lateral distance;

a plurality of components, each component including two upper strap segments extending beyond an upper edge of the component, the upper strap segments spaced apart by the lateral distance and adapted to be simultaneously couplable with the component coupling portions of both the first upper strap and the second upper strap, and each component including two lower strap segments extending beyond a lower edge of the component, the lower strap segments spaced apart by the lateral distance and adapted to be simultaneously couplable with the component coupling portions of both the first lower strap and the second lower strap, and wherein the upper strap segments of each component are further adapted to be simultaneously couplable with the lower strap segments of another of the plurality of components; and wherein the first and second upper straps, the first and second lower straps, and a series of the plurality of components are adapted to couple to form a continuous, linear connection between the upper opening and the lower opening of the locker door.

18. The system of claim 17, wherein the first and second upper straps, the first and second lower straps, and the series of the plurality of components are formed into the continuous, linear connection between the upper opening and the lower opening of the locker door.

19. The system of claim 17, wherein each of the component coupling portions of the first and second upper straps and each of the lower strap segments of the components includes an identical first portion of a coupling device, and wherein each of the component coupling portions of the first and second lower strap and each of the upper strap segments of the components includes an identical second portion of the coupling device.

* * * * *